United States Patent [19]
Kosugi et al.

[11] Patent Number: 5,561,542
[45] Date of Patent: Oct. 1, 1996

[54] OPTICAL COMMUNICATION SYSTEM AND METHOD FOR PERFORMING COMMUNICATION UNDER CLOCK CONTROL

[75] Inventors: Masato Kosugi, Yokohama; Atsushi Date, Tokyo; Kazumasa Hamaguchi, Yokohama; Toshiyuki Fukui, Kawasaki, all of Japan

[73] Assignee: Canon Kabushiki Kaisha, Tokyo, Japan

[21] Appl. No.: 352,746

[22] Filed: Dec. 2, 1994

[30] Foreign Application Priority Data

Dec. 9, 1993 [JP] Japan .................................. 5-309299

[51] Int. Cl.$^6$ .............................. H04B 10/20; H04J 14/00
[52] U.S. Cl. ........................... 359/118; 359/120; 359/124
[58] Field of Search .................................... 359/120, 117, 359/118, 119, 158, 121, 124, 127; 370/94.3, 85.4

[56] References Cited

U.S. PATENT DOCUMENTS

| | | | |
|---|---|---|---|
| 4,957,340 | 9/1990 | Kirkby | 359/127 |
| 5,043,981 | 8/1991 | Firoozmand et al. | 370/85.4 |
| 5,161,153 | 11/1992 | Westmore | 370/94.3 |
| 5,367,396 | 11/1994 | Sotom et al. | 359/124 |
| 5,404,241 | 4/1995 | Ota | 359/121 |

FOREIGN PATENT DOCUMENTS

| | | |
|---|---|---|
| 0131662 | 1/1985 | European Pat. Off. . |
| 0300649 | 1/1989 | European Pat. Off. . |

OTHER PUBLICATIONS

Pat. Abs. Jp., vol. 12, No. 204 (E-620) Jun. 11, 1988 (JP-A-63002445).

*Primary Examiner*—Leo Boudreau
*Assistant Examiner*—Bhavesh Mehta
*Attorney, Agent, or Firm*—Fitzpatrick, Cella, Harper & Scinto

[57] ABSTRACT

In an optical communication system, a plurality of apparatuses are connected by a star coupler. A signal from each of the optical communication apparatuses is received by a receiving device such as a photodiode while a signal to each of the apparatuses is transmitted by a transmitting device such as a laser diode. A reference clock is supplied to the transmitting device. A clock of the signal from an optical communication apparatus is extracted to generate a phase comparison information signal of the extracted clock and the reference clock so as to supply the phase comparison information signal to the transmitting device. In the optical communication apparatus, a clock from the signal from the transmitting device is extracted, the phase comparison information signal contained in the signal from the transmitting device is extracted, and a transmit clock of the signal to be transmitted from the optical communication apparatus is controlled and oscillated such that a phase difference represented by the phase comparison signal is minimized.

15 Claims, 16 Drawing Sheets

OPTICAL COMMUNICATION SYSTEM AND METHOD FOR PERFORMING COMMUNICATION UNDER CLOCK CONTROL

BACKGROUND OF THE INVENTION

1. Field of the Invention

The present invention relates to an optical communication system and method in which a plurality of optical communication apparatuses are connected to each other in a star-like shape.

2. Related Background Art

Optical fiber communication has been used in various fields such as a computer network and an audio interface in recent years.

To perform communication between remote communication apparatuses, it is insufficient to only transmit/receive data to be transmitted, and it is necessary to simultaneously transmit clock information or share the same clock information. For example, a conventional computer network such as FDDI uses a self synchronizing method in which data containing clock information therein is transmitted in one transmission system. In the self synchronizing method, as shown in FIG. 1, a clock extraction circuit 1802 extracts a clock from a signal photoelectrically converted by an O/E converter 1801. The clock need to be reproduced by a PPL (Phase-Locked Loop) circuit 1803 on a receive side.

In the above prior art, however, follow-up properties must be intentionally degraded to remove a jitter from the receive clock by the PPL circuit and stabilize the clock. This leads to an increase in overhead for channel connection, resulting in a low transmission speed. For this reason, this method cannot be applied to a channel requiring frequent connection switching. A digital PPL is used as a PLL technique for allowing high-speed locking. In this method, a counter is used as a VCO (Voltage-Controlled Oscillator), and a frequency much higher (preferably about 32 times) than a reproduction clock is necessary for original clocks. For this reason, this method cannot be applied to optical transmission using a clock frequency of about 100 MHz.

SUMMARY OF THE INVENTION

The present invention has been made to solve the above problems, and has as its object to provide a communication system in which clock control is always performed.

In order to achieve the above object, according to the present invention, there is provided the following optical communication system and method. Numbers in parentheses represent corresponding reference numerals in the accompanying drawings.

There is provided an optical communication system constituted by a plurality of optical communication apparatuses connected by a star coupler, comprising:

a plurality of optical communication apparatuses 101, 102, 103, 104;

a star coupler 123 connected to the plurality of optical communication apparatuses 101, 102, 103, 104;

receiving means 405, arranged near the star coupler, for receiving a signal from each of the optical communication apparatuses 101, 102, 103, 104;

transmitting means 506, arranged near the star coupler, for transmitting a signal to each of the optical communication apparatuses 101, 102, 103, 104;

means 313 for supplying a reference clock 315 to the transmitting means; and means 406, 501, 502, 509, 510 for extracting a clock 309, 310, 311, 312 of the signal received from each of the optical communication apparatuses 101, 102, 103, 104 by the receiving means 405, generating a phase comparison information signal of the extracted clock 309, 310, 311, 312 and the reference clock 315, and supplying the phase comparison information signal to the transmitting means 506, wherein each of the optical communication apparatuses 101, 102, 103, 104 has means 605 for extracting a clock 219 from the signal from the transmitting means 506, means 606, 608 for extracting the phase comparison information signal contained in the signal from the transmitting means 506, and means 607 for controlling and oscillating a transmit clock 220 of the signal to be transmitted from the optical communication apparatus such that a phase difference represented by the phase comparison information signal is minimized.

There is another aspect of the communication system as follows.

In each of the optical communication apparatuses 101, 102, 103, 104, the controlled transmit clock 220 is used as the transmit clock, and the clock 219 extracted from the signal from the transmitting means 506 is used as a receive clock during communication performed through the star coupler 123.

There is still another aspect of the communication system, in which the phase comparison information signal is set in the signal from the transmitting means 506 by modulating an intensity level of the signal transmitted from the transmitting means 506 by the phase comparison information signal, the means 606, 608 for extracting the phase comparison information signal in each of the optical communication apparatuses 101, 102, 103, 104 is means 606, 608 for detecting the intensity level of the signal from the transmitting means 506, and the phase comparison information signal is extracted from the signal from the transmitting means 506 by detecting the intensity level of the signal from the transmitting means 506.

There is also still another aspect in which the means 606, 608 for detecting the intensity level is also at least partially used as means 603, 606, 608 for keeping a predetermined signal intensity upon receipt of the signal from the transmitting means 506, and the phase comparison information signal is extracted from the signal from the transmitting means 506 as a gain necessary for keeping the predetermined signal intensity.

There is still another aspect of the communication system as follows.

A channel $\lambda_0$ between the optical communication apparatuses 101, 102, 103, 104, the receiving means 405, and the transmitting means 506, and a channel $\lambda_1, \lambda_2$ between the optical communication apparatuses 101, 102, 103, 104 and the star coupler are multiplexed and constituted in a common path 106, 107, 108, 109, 110, 111, 112, 113.

There is still another aspect of the communication system, further comprising an arbiter 122 for performing arbitration of communication performed by each of the optical communication apparatuses 101, 102, 103, 104 through the star coupler, the arbiter transmitting/receiving an arbitration signal to/from each of the optical communication apparatuses 101, 102, 103, 104 by the receiving means 405 and the transmitting means 506.

There is also still another aspect in which the arbiter 122 and the star coupler 123 are arranged in a concentrator 105.

There is provided the following optical communication method, that is, an optical communication method in an optical communication system constituted by a plurality of optical communication apparatuses 101, 102, 103, 104 connected by a star coupler 123, comprising the steps of:

receiving a signal from each of the optical communication apparatuses 101, 102, 103, 104 by receiving means 405 arranged near the star coupler 123 and extracting a clock 309, 310, 311, 312 from the received signal;

generating a phase comparison information signal of the extracted clock 309, 310, 311, 312 and a reference clock 315 supplied near the star coupler 123;

transmitting a signal containing at least the generated phase comparison information signal to each of the optical communication apparatuses 101, 102, 103, 104 with the reference clock 315 by transmitting means 506 arranged near the star coupler 123;

extracting the clock 219 and the phase comparison information signal from the signal transmitted from the transmitting means 506 in each of the optical communication apparatuses 101, 102, 103, 104; and controlling a transmit clock 220 in each of the optical communication apparatuses 101, 102, 103, 104 such that a phase difference represented by the extracted phase comparison information signal is minimized.

There is still another aspect of the optical communication method as follows.

In each of the optical communication apparatuses 101, 102, 103, 104, the controlled transmit clock 220 is used as the transmit clock, and the clock 219 extracted from the signal from the transmitting means 506 is used as a receive clock during communication performed through the star coupler 123.

There is still another aspect of the optical communication method, in which the phase comparison information signal is set in the signal from the transmitting means 506 by modulating an intensity level of the signal transmitted from the transmitting means 506 by the phase comparison information signal, and the phase comparison information signal is extracted from the signal from the transmitting means 506 by detecting the intensity level of the signal from the transmitting means 506 in each of the optical communication apparatuses 101, 102, 103, 104.

There is also still another aspect in which, in each of the optical communication apparatuses 101, 102, 103, 104, the intensity level of the signal from the transmitting means 506 is detected to extract the phase comparison information signal from the signal from the transmitting means 506 as a gain necessary for keeping a predetermined intensity level of the signal from the transmitting means 506.

There is still another aspect of the optical communication method as follows.

A channel $\lambda_0$ between the optical communication apparatuses 101, 102, 103, 104, the receiving means 405, and the transmitting means 506, and a channel $\lambda_1$, $\lambda_2$ between the optical communication apparatuses 101, 102, 103, 104 and the star coupler 123 are multiplexed and constituted in a common path 106, 107, 108, 109, 110, 111, 112, 113.

There is still another aspect of the optical communication method, in which an arbiter 122 for performing arbitration of communication performed by each of the optical communication apparatuses 101, 102, 103, 104 through the star coupler 123 is provided, the arbiter 122 transmitting/receiving an arbitration signal to/from each of the optical communication apparatuses 101, 102, 103, 104 by the receiving means 405 and the transmitting means 506.

There is also still another aspect in which the arbiter 122 and the star coupler 123 are arranged in a concentrator 105.

DETAILED DESCRIPTION OF THE PREFERRED EMBODIMENTS

Figure 2:
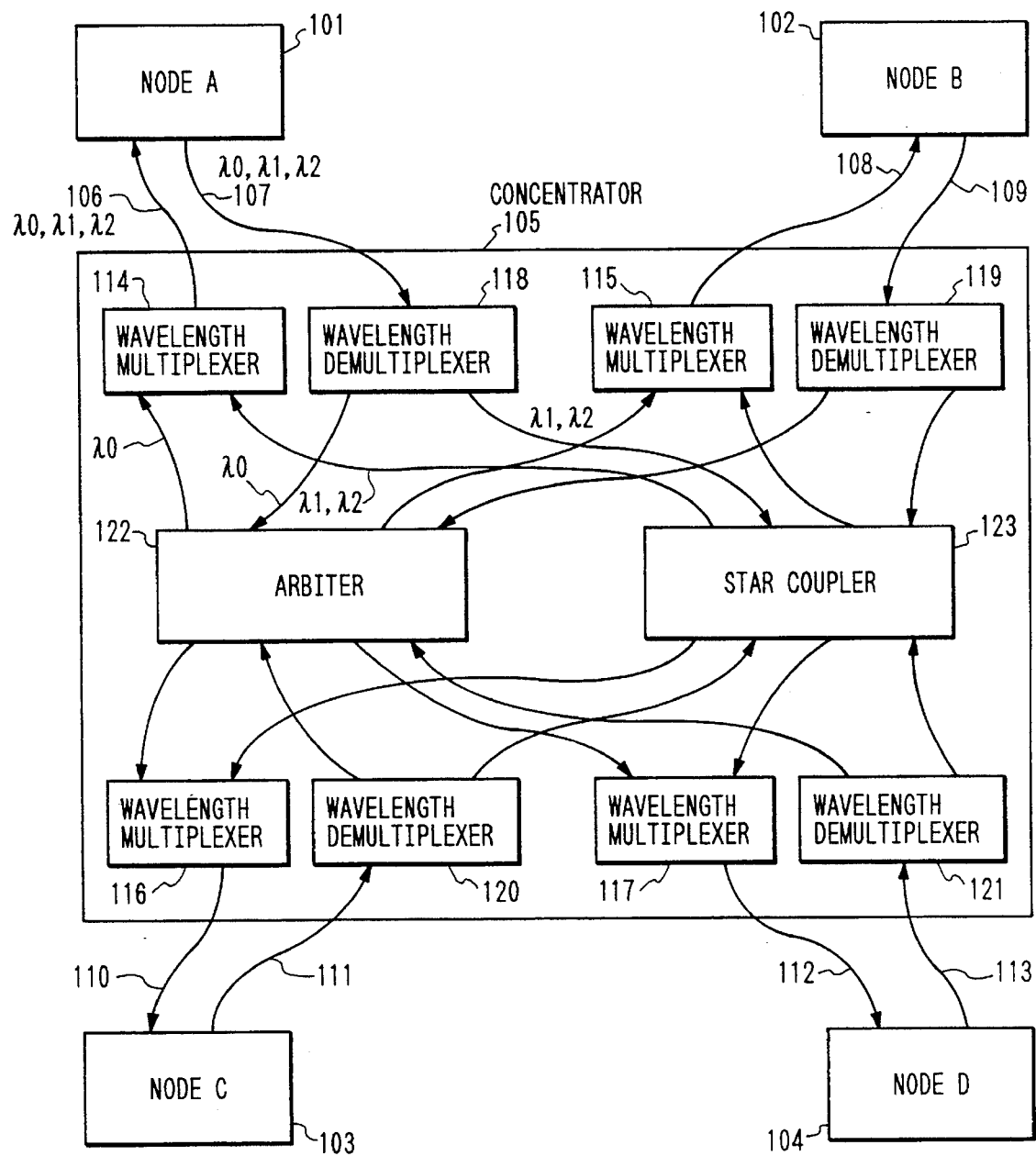
FIG. 2 is a view showing the arrangement of a system of the first embodiment.

FIG. 2 is a view showing the arrangement of a system of this embodiment. This system includes calculation nodes 101 to 104 each having an optical communication apparatus, a concentrator 105 for connecting the nodes with each other, and optical fiber cables 106 to 113, serving as an optical path which constitutes first and second optical channel groups therein by wavelength division multiplexing, for connecting the nodes and the concentrator. In the optical fiber cables 106 to 113, three wavelengths $\lambda_0$ to $\lambda_2$ used as an arbitration wavelength for the second optical channel and a data transfer wavelength for the first optical channel are multiplexed. Wavelength multiplexers 114 to 117 multiplex the arbitration wavelength $\lambda_0$ and the data transfer wavelengths $\lambda_1$ and $\lambda_2$. Wavelength demultiplexers 118 to 121 demultiplex a multiplexed optical signal input from each node into the wavelength $\lambda_0$ and the wavelengths $\lambda_1$ and $\lambda_2$.

An arbiter 122 has an optical transmission/reception apparatus capable of receiving an optical signal from each node and transmitting the optical signal to each node. An optical star coupler 123 connects the star-shaped first optical channel. In this arrangement, the star coupler has four input terminals and four output terminals. This arrangement uses four nodes and two data transfer wavelengths, through it is not limited. The number of data transfer wavelengths is preferably ½ or more the number of nodes.

Figure 3:
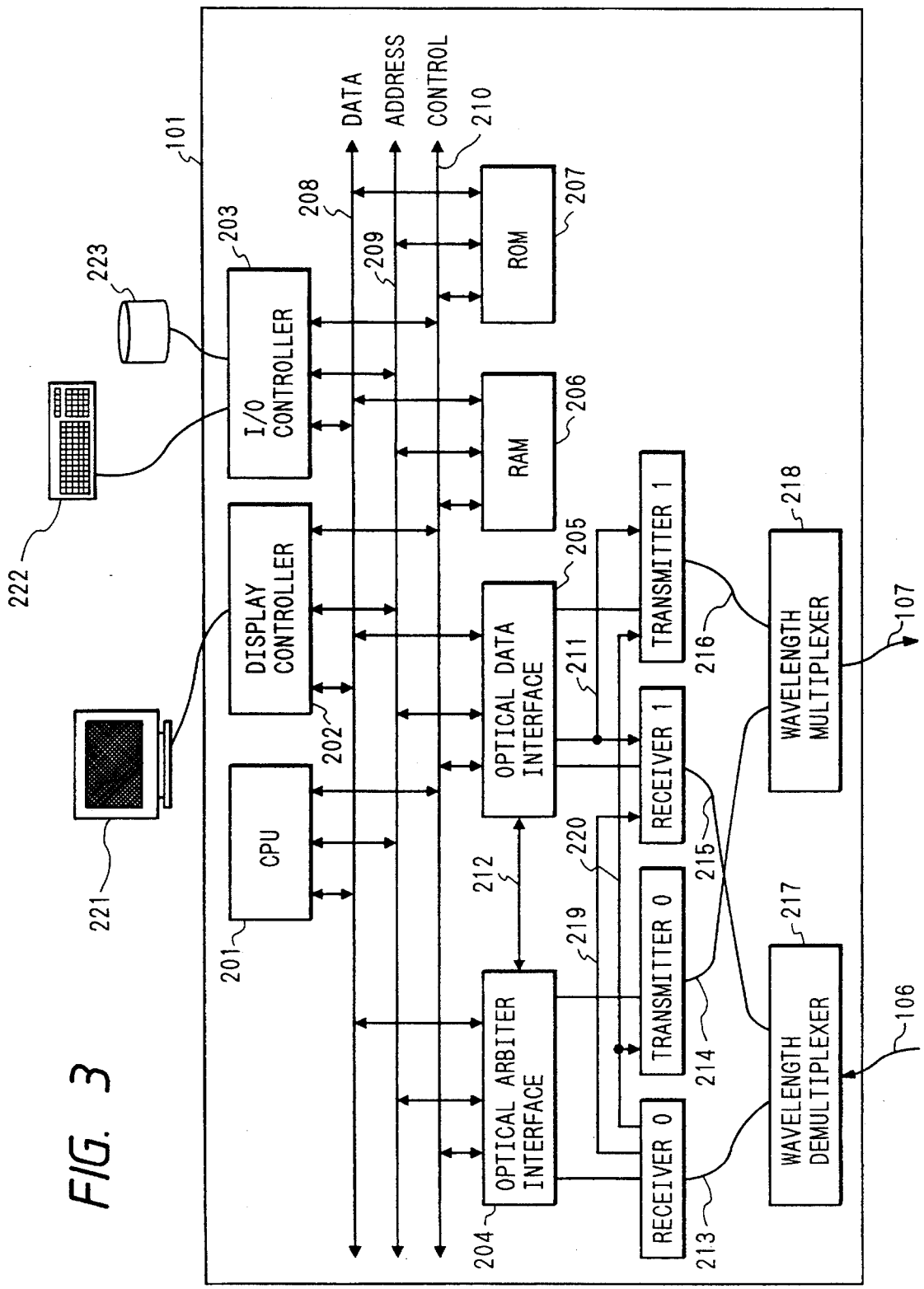
FIG. 3 is a view showing the arrangement of a node of the first embodiment.

FIG. 3 is a view showing a calculation node corresponding to the node A 101 in FIG. 2. The nodes B to D also have the same arrangement. A processor 201 in the calculation node performs various information processing on the basis of programs and data stored in a RAM 206 and a ROM 207 by using a display controller 202, an I/O controller 203 and the like. This arrangement is general for a general-purpose computer and not limited by the present invention. The calculation node includes a data bus 208, an address bus 209, and a control bus 210. These buses are arbitrated by a bus arbitration function of the processor 201 and used for data transfer by the processor 201 and an optical data interface 205. The calculation node also includes an optical arbiter interface 204, the optical data interface 205, a receiver 213 for photoelectrically converting the wavelength $\lambda_0$, a receiver 215 for selectively photoelectrically converting the wavelength $\lambda_1$ or $\lambda_2$, a transmitter 214 for emitting light of the wavelength $\lambda_0$, and a transmitter 216 for selectively emitting light of the wavelength $\lambda_1$ or $\lambda_2$. A wavelength demultiplexer 217 demultiplexes an optical signal input from the concentrator into the arbitration wavelength $\lambda_0$ and the data transfer wavelengths $\lambda_1$ and $\lambda_2$. A wavelength multiplexer 218 multiplexes optical signals of different wavelengths, which are output from the transmitters 214 and 216. A wavelength control signal 211 is input to the receiver 215 and the transmitter 216. An information transmission signal line group 212 is arranged between the optical arbiter interface 204 and the optical data interface 205. A receive clock 219 is output from a clock extraction circuit 605 (to be described later) serving as a first extracting means in the receiver 213. A transmit clock 220 is output from an oscillating circuit 607 (to be described later) serving as a second oscillating means in the receiver 213. The node also includes a display unit 221, a keyboard 222, and a disk unit 223.

Figure 4:
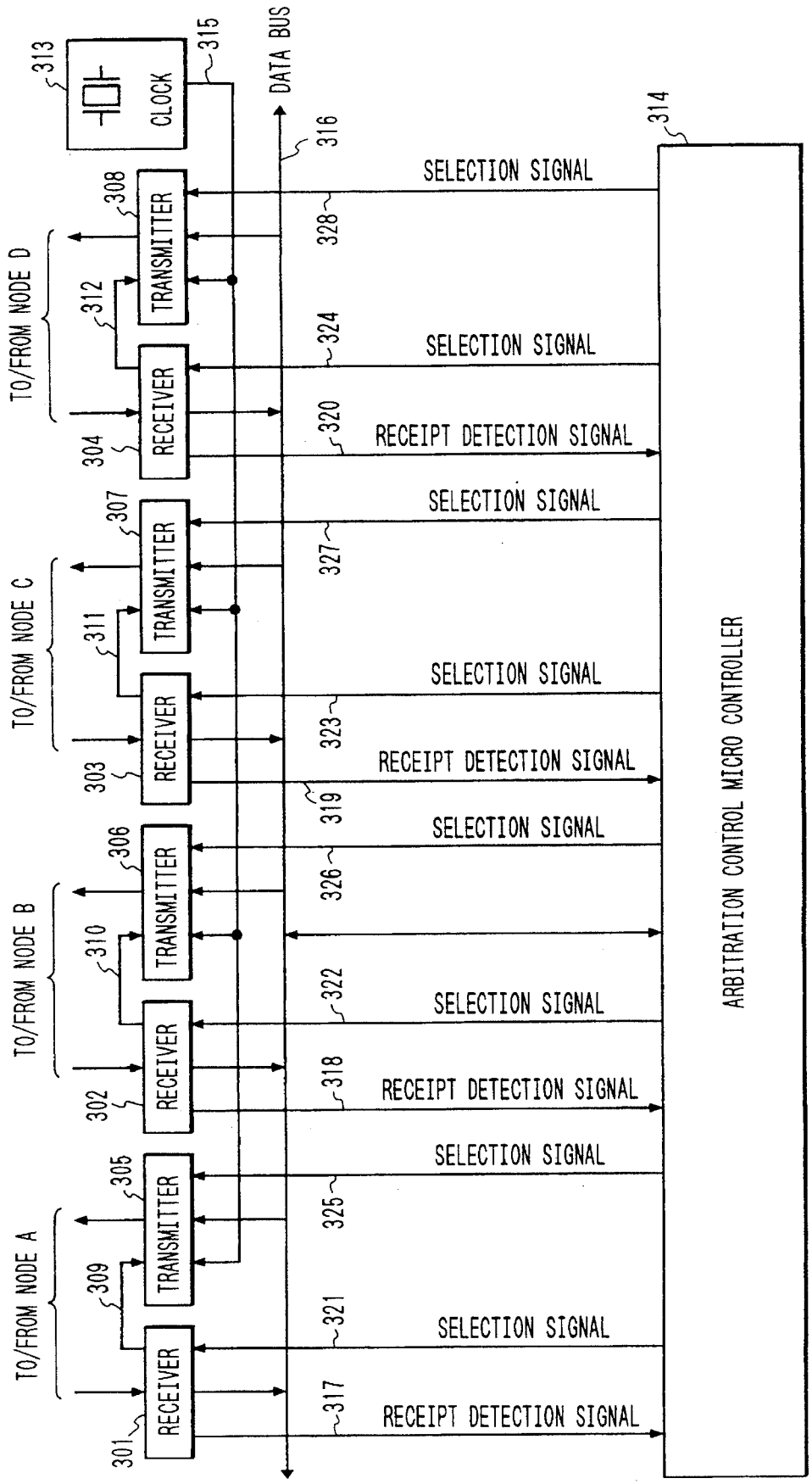
FIG. 4 is a block diagram of an arbiter of the first embodiment.

FIG. 4 is a block diagram of the arbiter 122 in the concentrator 105. Each of receivers 301 to 304 receives an optical signal of the arbitration wavelength $\lambda_0$, which is demultiplexed by corresponding one of the demultiplexers 118 to 121 in the concentrator 105, converts the optical signal into an electrical signal, and outputs it as parallel data. Each of transmitters 305 to 308 outputs an optical signal of the arbitration wavelength $\lambda_0$ to a corresponding one of the wavelength multiplexers 114 to 117. These receivers and transmitters are provided in correspondence with the respective nodes. Receive clocks 309 to 312 are output from a clock extraction circuit 406 (to be described later) serving as a second extracting means in the receivers 301 to 304. The arbiter 122 also includes a reference clock generator 313 serving as a first oscillating means, a reference clock 315, and an arbitration control micro controller (to be referred to as an ACMC hereinafter) 314. In this embodiment, a micro controller having the ACMC incorporating a program ROM and a RAM serving as a work area is used. However, it is not limited by the present invention, and a discrete circuit having a function to be described in this embodiment may also be used. The arbiter 122 also has a data bus 316. Receipt detection signals 317 to 320 inform the ACMC that an arbitration request packet is received from the nodes. The ACMC 314 outputs selection signals 321 to 328 to select the transmitter or receiver.

Figure 5:
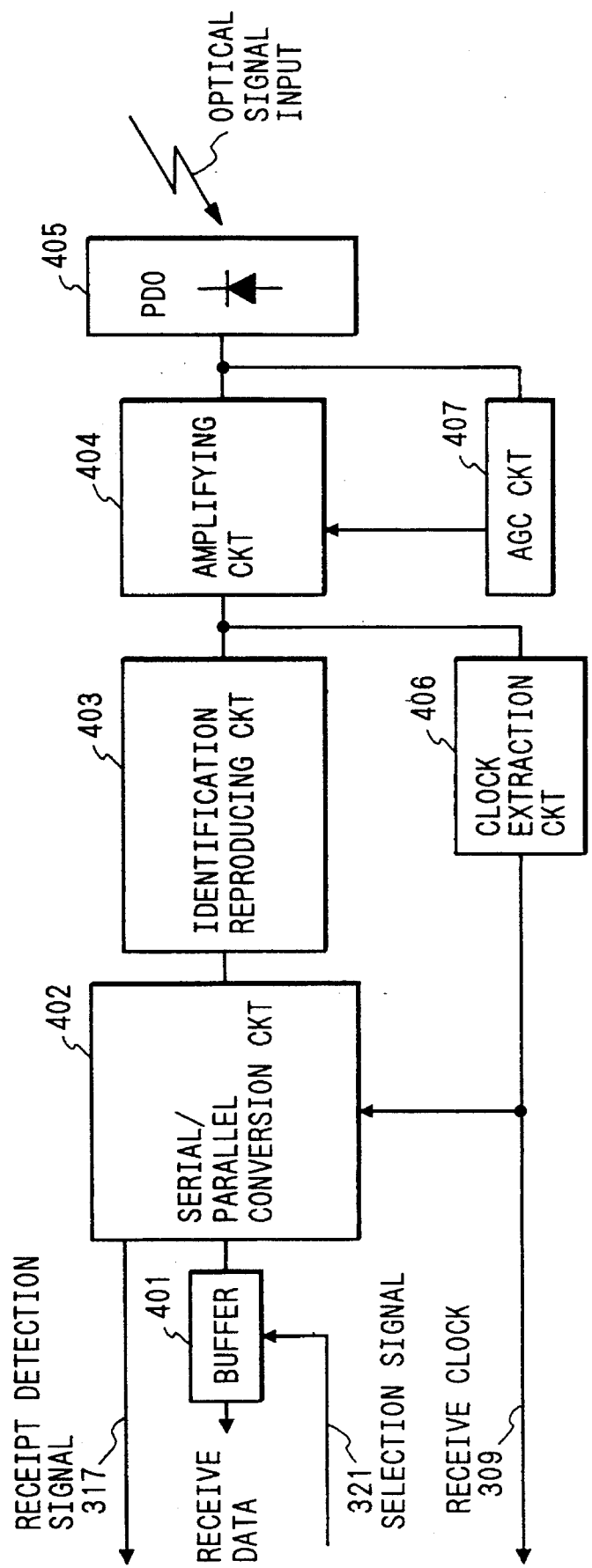
FIG. 5 is a block diagram showing the arrangement of a receiver in the arbiter of the first embodiment.

FIG. 5 is a block diagram of the receiver 301 in the arbiter 122. The remaining receivers 302 to 304 also have the same arrangement. The receiver 301 includes a photodiode (PD) 405 for photoelectrically converting light of the wavelength $\lambda_0$, an amplifying circuit 404, an AGC (Automatic Gain Control) circuit 407 for controlling the amplification factor of the amplifying circuit, an identification reproducing circuit 403 for binarizing a receive signal, the circuit 406, serving as the second extracting means, for extracting a clock from the receive signal, a serial/parallel conversion circuit 402 for converting the binary serial receive data into parallel data, and a buffer 401 for temporarily storing the parallel data.

Figure 6:
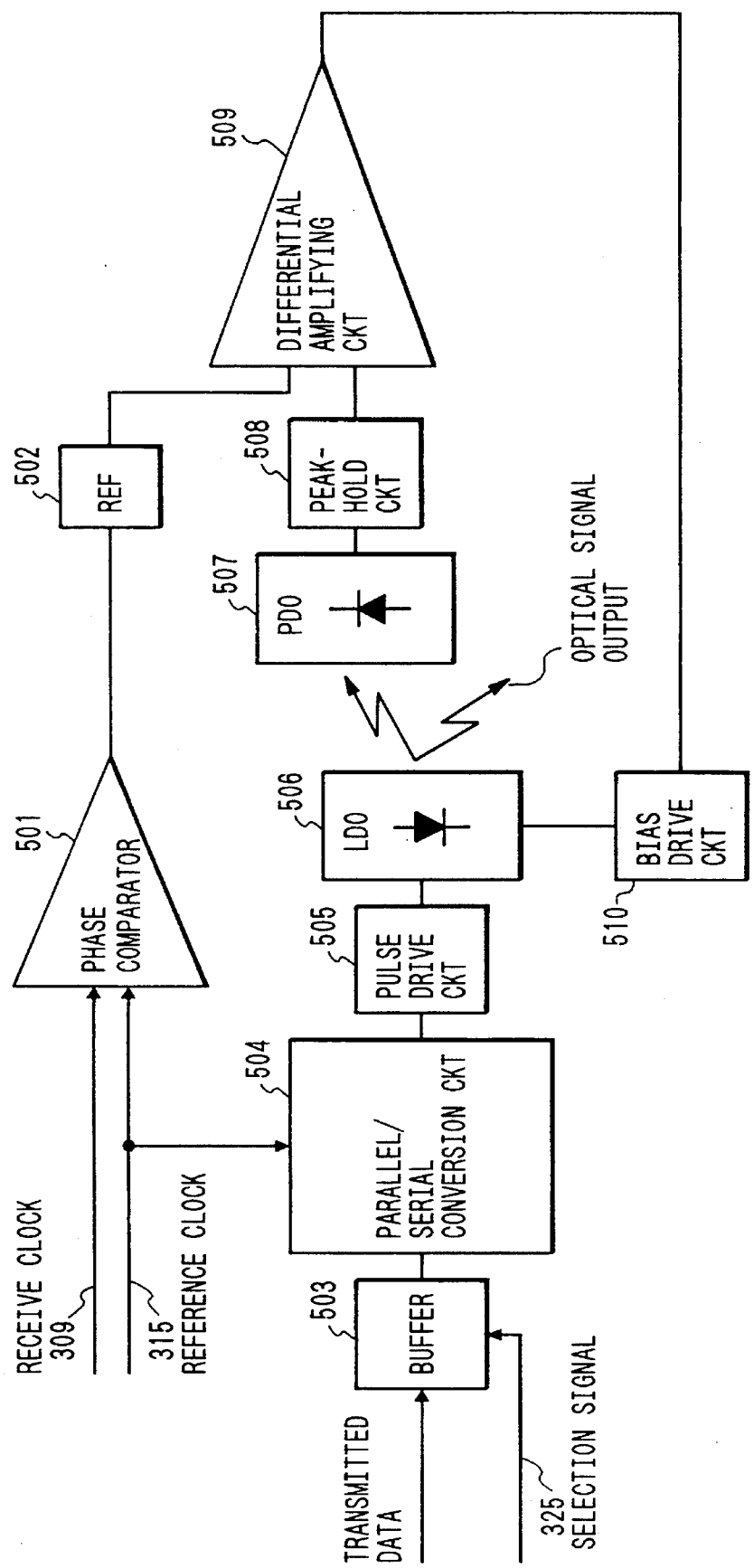
FIG. 6 is a block diagram showing the arrangement of a transmitter in the arbiter of the first embodiment.

FIG. 6 is a block diagram of the transmitter 305 in the arbiter 122. The remaining transmitters 306 to 308 also have the same arrangement. The transmitter 305 includes a buffer 503 for temporarily storing transmitted data, a parallel/serial conversion circuit 504 for converting the parallel transmitted data into serial data, a laser diode (LD) 506, serving as a first transmitting means, for emitting light of the wavelength $\lambda_0$. A pulse drive circuit 505 for intensity-modulating the LD 506 in accordance with the serial transmitted data, and a phase comparator 501, serving as a phase comparing means, for comparing the phase of the receive clock with that of the reference clock and outputting a phase difference therebetween in DC. An optical power control means is constituted by elements 507, 508, 502, 509, and 510. The PD 507 monitors light of the wavelength $\lambda_0$. The peak-hold circuit 508 temporarily holds the peak value of an output from the PD 507. The reference voltage 502 changes in proportion to an output from the phase comparator 501. The differential amplifying circuit 509 obtains a difference between the held peak value and the reference voltage. The bias drive circuit 510 receives an output from the differential amplifying circuit 509 to determine the peak power of the LD 506.

Figure 7:
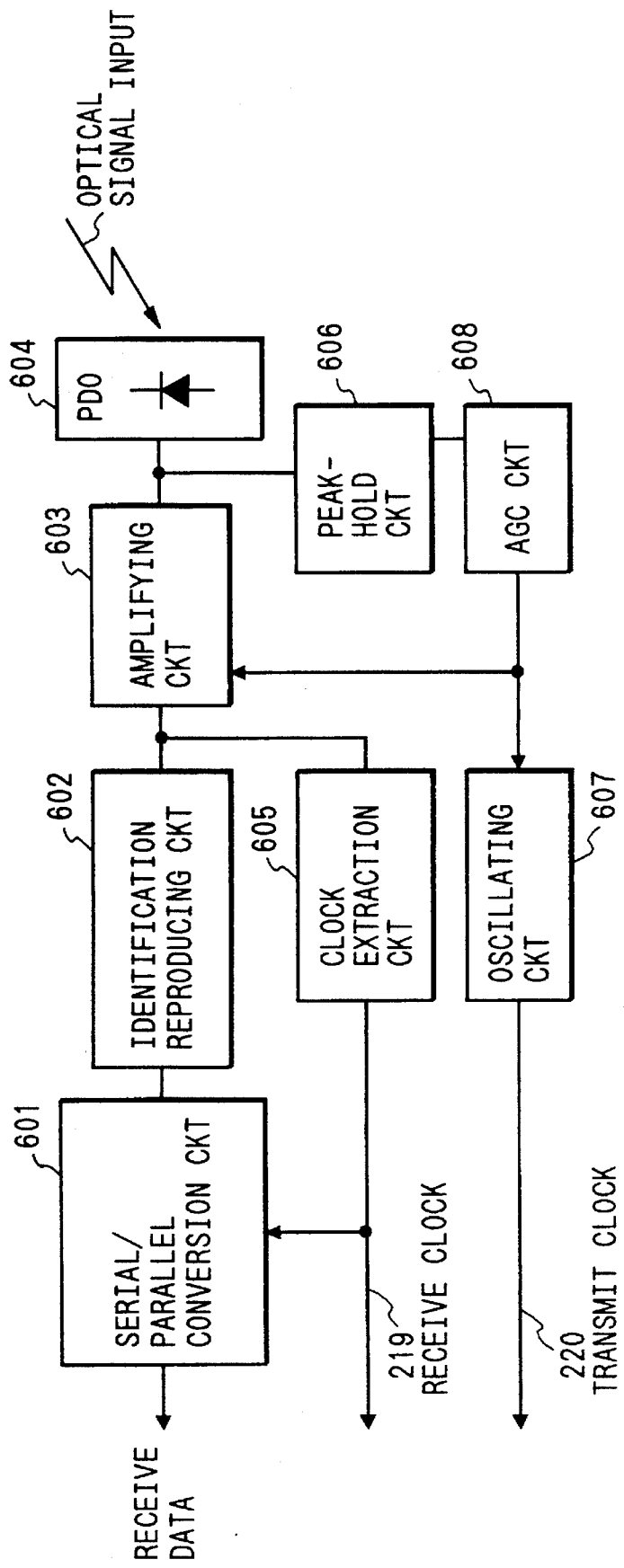
FIG. 7 is a block diagram showing the arrangement of a receiver for receiving an arbitration signal in the node of the first embodiment.

FIG. 7 is a block diagram of the receiver 0 213 in the node A 101. The receiver 0 203 includes an amplifying circuit 603. An optical power detecting means is constituted by elements 604, 606, and 608. The PD 604 photoelectrically converts light of the wavelength $\lambda_0$. The peak-hold circuit 606 temporarily holds the peak value of an output from the PD. The AGC circuit 608 controls the amplification factor of the amplifying circuit on the basis of the peak value held by the peak-hold circuit 606. The receiver 0 213 also includes an identification reproducing circuit 602 for binarizing a receive signal, the clock extraction circuit 605, serving as the first extracting means, for extracting a clock from the receive signal, a serial/parallel conversion circuit 601 for converting the binary serial receive data into parallel data, and the oscillating circuit 607, serving as the second oscillating means, for finely changing an oscillation frequency with reference to the gain controlled by the AGC circuit 608.

Figure 8:
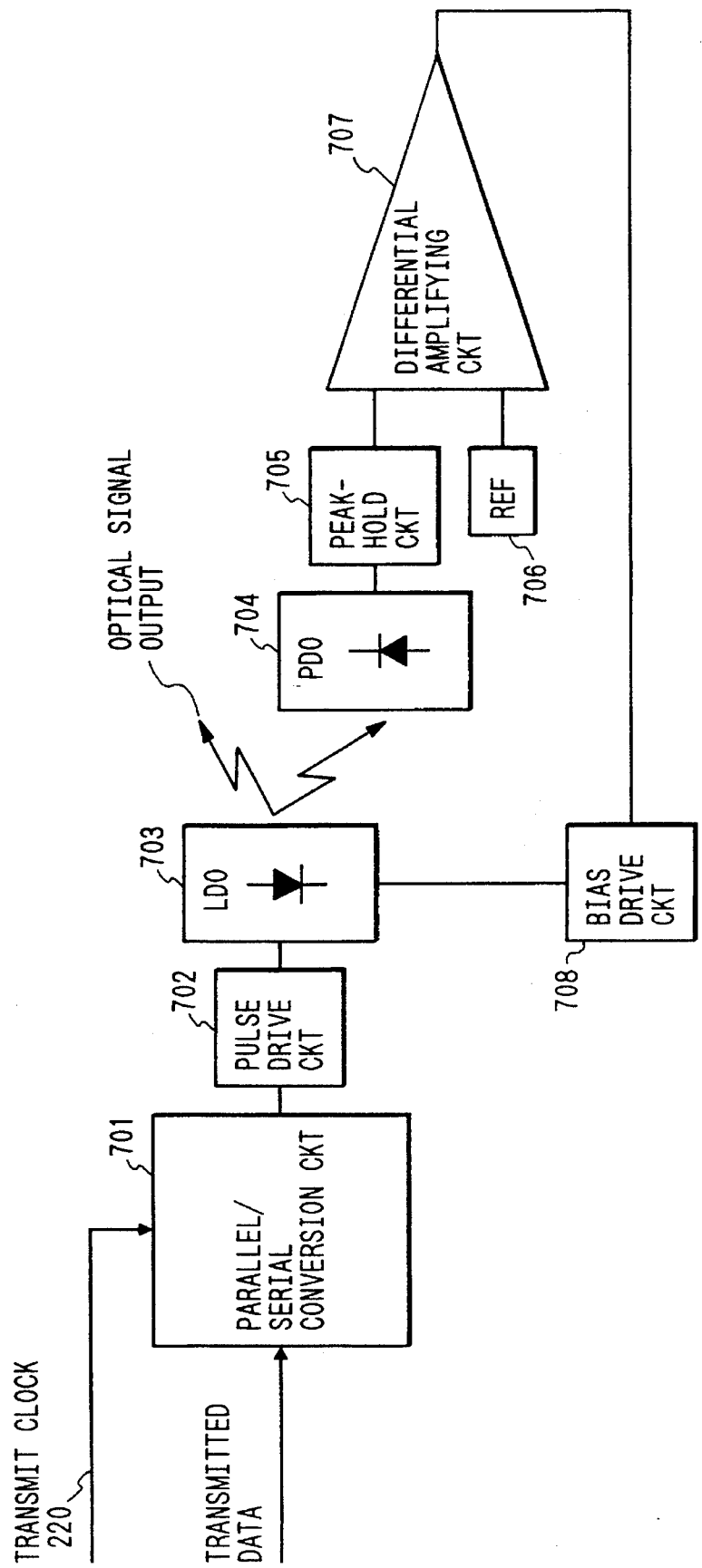
FIG. 8 is a block diagram showing the arrangement of a transmitter for transmitting the arbitration signal in the node of the first embodiment.

FIG. 8 is a block diagram of the transmitter 0 (214) in the node A 101. The transmitter 0 (214) includes a parallel/serial conversion circuit 701 for converting parallel transmitted data into serial data, an LD 703, serving as a second transmitting means, for emitting light of the wavelength $\lambda_0$, a pulse drive circuit 702 for intensity-modulating the LD 703 in accordance with the serial transmitted data, a PD 704 for monitoring the light of the wavelength $\lambda_0$, a peak-hold circuit 705 for temporarily holding the peak value of an output from the PD 704, a reference voltage generator 706, a differential amplifying circuit 707 for obtaining a difference between the held peak value and a reference voltage, and a bias drive circuit 708 for receiving an output from the differential amplifying circuit 707 to determine the peak power of the LD 703.

Figure 9:
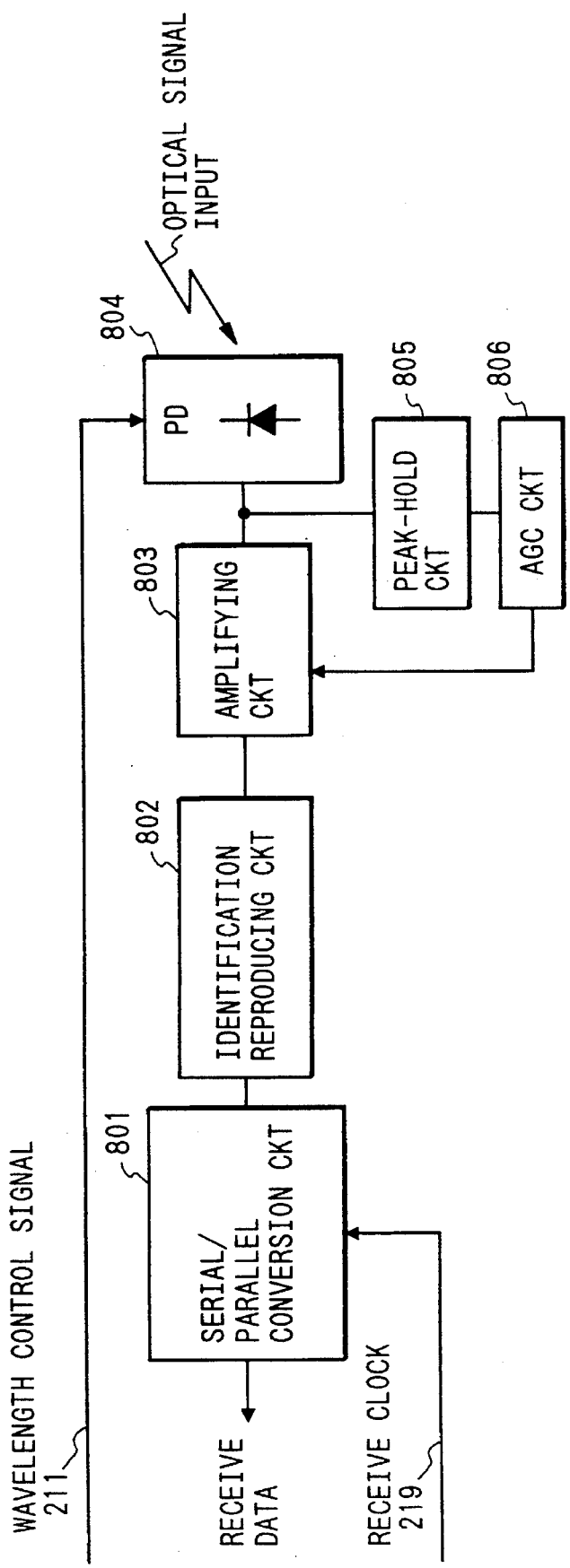
FIG. 9 is a block diagram showing the arrangement of a receiver for receiving a data transfer signal in the node of the first embodiment.

FIG. 9 is a block diagram of the receiver 1 (215) in the node A 101. The receiver 1 (215) includes a PD 804, serving as a receiving means, for selectively photoelectrically converting light of the wavelength $\lambda_1$ or $\lambda_2$, an amplifying circuit 803, a peak-hold circuit 805 for holding the peak value of an output from the PD 804, an AGC circuit 806 for controlling the gain of the amplifying circuit, an identification reproducing circuit 802 for binarizing a receive signal, and a serial/parallel conversion circuit 801 for converting the binary serial data into parallel data.

Figure 10:
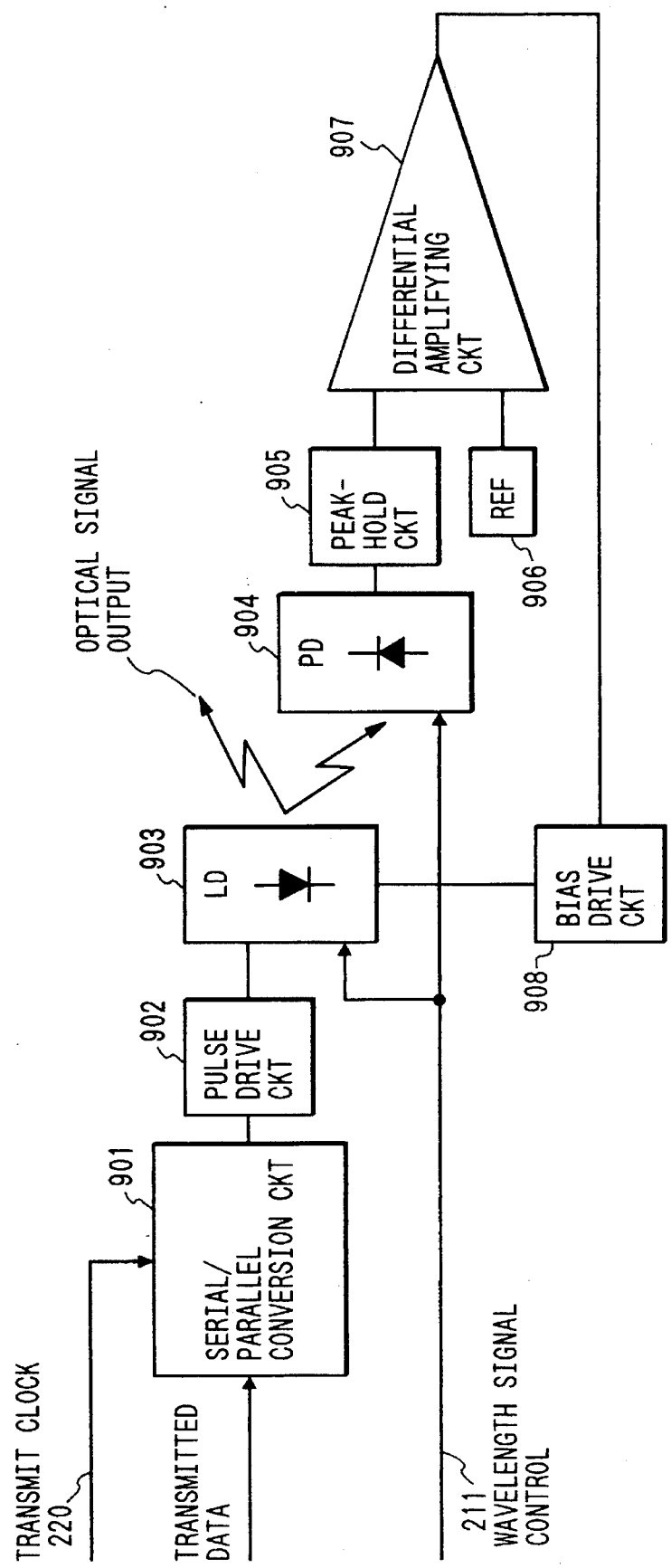
FIG. 10 is a block diagram showing the arrangement of a transmitter for transmitting the data transfer signal in the node of the first embodiment.

FIG. 10 is a block diagram of the transmitter 1 (216) in the node A 101. The transmitter 1 (216) includes a serial/parallel conversion circuit 901 for converting parallel transmitted data into serial data, an LD 903, serving as a third transmitting means, for selectively emitting light of the wavelength $\lambda_1$ or $\lambda_2$, a pulse drive circuit 902 for intensity-modulating the LD 903 in accordance with the serial transmitted data, a PD 904 for selectively monitoring the light of the wavelength $\lambda_1$ or $\lambda_2$, a peak-hold circuit 905 for temporarily holding the peak value of an output from the PD 904, a reference voltage generator 906, a differential amplifying circuit 907 for obtaining a difference between the held peak value and a reference voltage, and a bias drive circuit 908 for receiving an output from the differential amplifying circuit 907 to determine the peak power of the LD 903.

Figure 11:
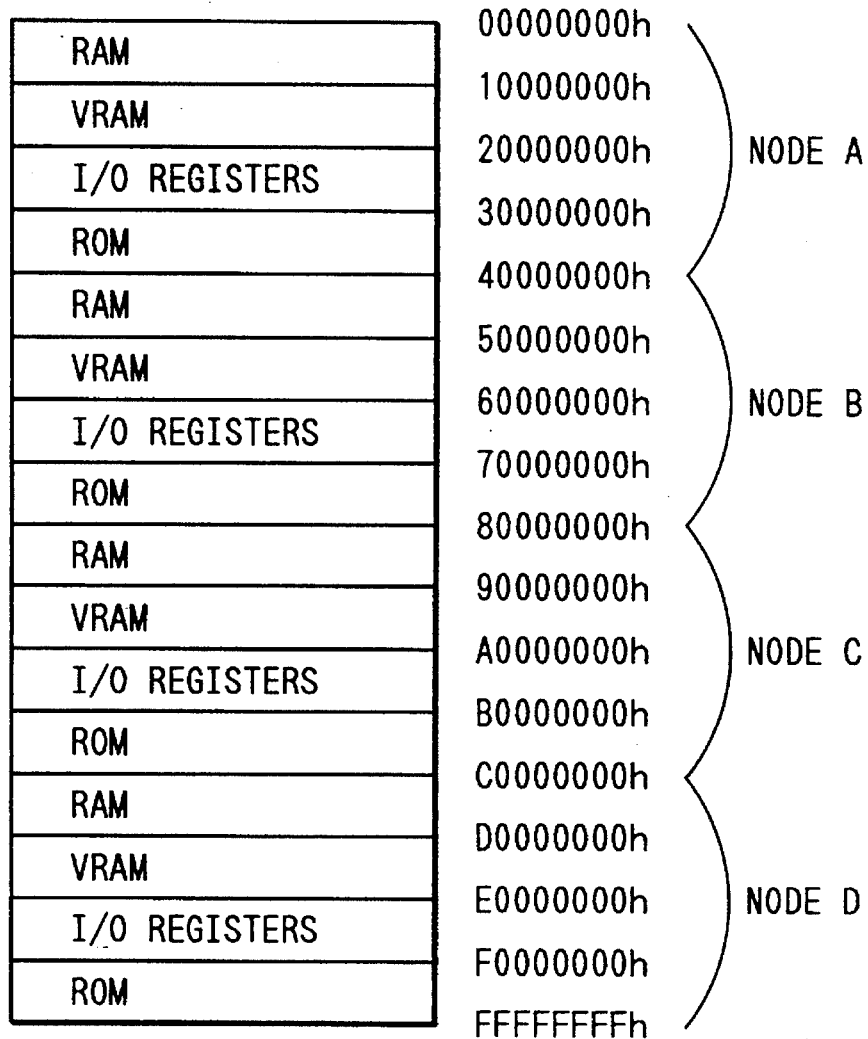
FIG. 11 is a view showing a system address map of the first embodiment.

FIG. 11 is a view showing an address map of the entire system. In this embodiment, the address map of 4 GB (B:byte) in the entire system is distributed to the four nodes.

An operation will be described below in which the processor 201 of the node A 101 reads out data corresponding 8 bytes from address 40000000h in the RAM of the node B 102.

<Phase 1> Transmission of Arbitration Request Packet

Figure 12:
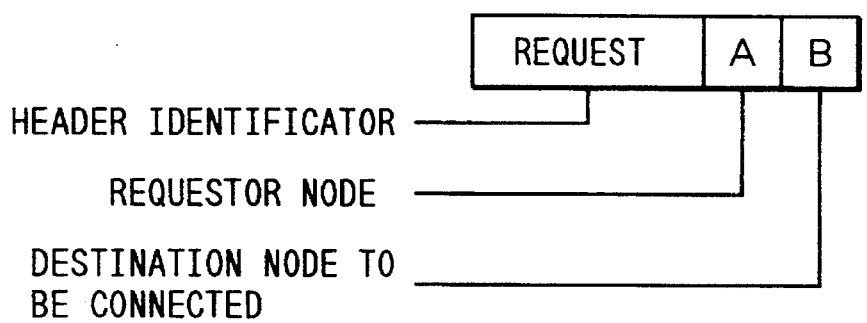
FIG. 12 is a view showing an arbitration request packet used in the first embodiment.

The CPU 201 of the node A gains the right of use of the buses in the node and outputs an address value of "40000000h" to the address bus 209 and a signal representing read access and 8-byte access to the control bus 210. The optical arbiter interface 204 performs address decoding and detects generation of access to a node other than the self node because the corresponding address is not present in the self node. The optical arbiter interface 204 designates the optical data interface 205 to latch the contents of the buses by the transmission/reception request signal 212. In addition, an arbitration request packet (:ARP in FIG. 12) for requesting connection to the node B is formed and output to the transmitter 214 for emitting light of the wavelength $\lambda_0$. The ARP is represented by a data form after conversion by the parallel/serial conversion circuit 701. The ARP is converted into a code form suitable to serial transmission in 4B/5B conversion or the like by the parallel/serial conversion circuit 701 and output. If no ARP is present, the parallel/serial conversion circuit 701 generates and continuously outputs an idle packet with sufficient transition between levels "0" and "1" and no DC component such that synchronization with the arbiter 122 in the concentrator 105 is maintained. The idle packet is necessary for the input side to recognize continuation of connection of channels. However, since this packet is insignificant, it is lost in the arbiter 122. The pulse drive circuit 702 intensity-modulates the drive of the LD 703 in accordance with the ARP, thereby causing the LD 708 to emit light. The LD 703 outputs the ARP as light of the wavelength $\lambda_0$ to the wavelength multiplexer 218. The light of the wavelength $\lambda_0$ is monitored by the PD 704. The peak value of the light is held by the peak-hold circuit 705. A difference between the peak value and the reference voltage 706 is obtained by the differential amplifying circuit 707 and input to the bias drive circuit 708. The bias drive circuit 708 controls a DC bias current of the LD 703 in accordance with the output from the differential amplifying circuit 707. More specifically, if the peak value is larger than the reference voltage value, the DC bias current is decreased. If the peak value is smaller than the reference voltage value, the DC bias current is increased. With the above operation, the optical signal output $\lambda_0$ is always fed back such that it is controlled to a predetermined power. The ARP propagates in the optical cable 107 as light of the wavelength $\lambda_0$.

<Phase 2> Arbitration and Transmission of Connection Request Packet

Figure 13:
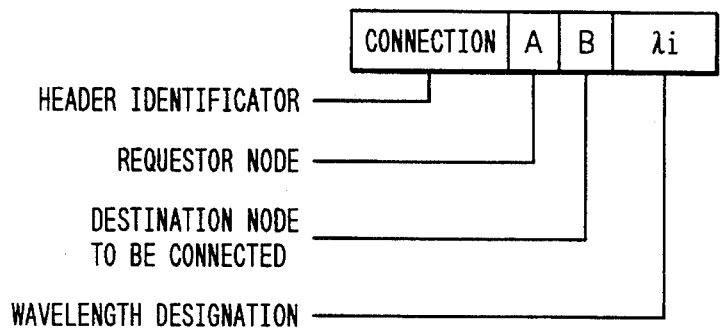
FIG. 13 is a view showing a connection request packet used in the first embodiment.

The wavelength demultiplexer 118 in the concentrator demultiplexes the light of the wavelength $\lambda_0$ and outputs the light to the receiver 301. Therefore, the ARP output from the node A is photoelectrically converted by the PD 405 and output to the amplifying circuit 404. At the same time, the output is also input to the AGC circuit 407. The AGC circuit 407 controls a gain to the amplifying circuit 404 such that a predetermined peak power of the output from the PD 405 is obtained. When the ARP is not transmitted, the idle packet is transmitted, so that a signal input to the identification reproducing circuit 403 is kept at a predetermined peak level. An output from the amplifying circuit 404 is binarized by the identification reproducing circuit 403 while a clock is extracted by the clock extraction circuit 406. The clock extraction circuit 406 has a quartz crystal oscillator and performs a PLL in which its output is phase-locked with the edge of the receive signal, thereby extracting a clock. The receive data binarized by the identification reproducing circuit 403 is input to the serial/parallel conversion circuit 402. The serial/parallel conversion circuit 402 is operated in accordance with the receive clock 309 to 5B/4B or parallel-converts the received serial data. If the idle packet is received, it is lost. If the ARP is received, it is recognized and output to the buffer 401. The receipt detection signal 317 is asserted to inform the ACMC of reception of the ARP. The ACMC asserts the selection signal 321 to select the receiver 301 and reads out the ARP transmitted from the node A through the data bus 316. Thereafter, this packet is analyzed, and it is detected that the channel use request is a request for connection between the nodes A and B. A channel use state flag representing nodes in a busy state and a wavelength in use is provided in a form of software in the internal RAM of the ACMC. With reference to the channel use state flag, the ACMC checks whether a destination node to be connected (node B in this embodiment) can be externally accessed, or which wavelength is currently usable. If the node B can be externally accessed, an available wavelength (e.g., $\lambda_1$) is assigned, a connection preparation request packet shown in FIG. 13 is formed, and the selection signals 325 and 326 are asserted to write the packet in the transmitters 305 and 306. The channel use state flag is updated to a state representing that the node B is being externally accessed, and the assigned wavelength $\lambda_1$ is in use. If the node B cannot be externally accessed, or if no available wavelength is present, the ACMC is set in an idle state until the arrival of an end packet (to be described later) or another ARP is detected. If another ARP is received, the similar arbitrating operation is performed. If an end packet related to the channel connected to the node B is received, or an available wavelength is obtained, the connection preparation request packet (FIG. 13) is formed in the similar manner. The selection signals 325 and 326 are asserted to write the packet in the transmitters 305 and 306, and the channel use state flag is updated. The written connection preparation request packet is buffered in the buffer 503 in each of the transmitters 305 and 306. The parallel/serial conversion circuit 504 converts the transmitted data by 4B/5B conversion or the like at the timing of the reference clock 315. When no transmission packet is present, the parallel/serial conversion circuit 504 also outputs an idle packet to keep connection. The serial transmitted data is intensity-modulated by the pulse drive circuit 505. The LD 506 emits light of the arbitration wavelength $\lambda_0$ to output an optical signal. Like the LD 703, the LD 506 is controlled in its power by feedback from the monitor PD 507, the peak-hold circuit 508, the differential amplifying circuit 509, and the bias drive circuit 510. The reference voltage generated by the reference voltage generator 502 and input to the differential amplifying circuit 509 varies depending on an output from the phase comparator 501. More specifically, the DC bias voltage output from the bias drive circuit 510 varies depending on a phase difference between the reference clock 315 and the receive clock 309, both of which are input to the phase comparator 501. If the phase of the receive clock 309 is advanced from that of the reference clock 315, the reference voltage from the reference voltage generator 502 is decreased. If the phase of the receive clock 309 is delayed from that of the reference clock 315, the reference voltage is increased. Therefore, feedback is performed such that, if the phase of the receive clock 309 is advanced from that of the reference clock 315, the power of light emitted from the LD 506 is decreased, and if the phase of the receive clock 309 is delayed from that of the reference clock 315, the power of light is increased. The optical signal output is output to the nodes A and B through the wavelength multiplexers 114 and 115 and the optical fiber cables 106 and 108.

<Phase 3> Preparation for Connection

In the node A 101, the optical signal input through the optical fiber cable 106 is demultiplexed by the wavelength demultiplexer 217, and the optical signal of the wavelength $\lambda_0$ is input to the receiver 0 213. Therefore, the connection preparation request packet output from the arbiter 122 is photoelectrically converted by the PD 604 and output to the amplifying circuit 603. At the same time, the output is also input to the AGC circuit 608. The AGC circuit 608 always controls the gain to the amplifying circuit 603 such that a predetermined peak power of an output from the PD 604 is obtained. When the connection preparation request packet is not transmitted, an idle packet is transmitted, so that a signal input to the identification reproducing circuit 602 can be kept at a predetermined peak level. An output from the amplifying circuit 603 is binarized by the identification reproducing circuit 602 while a clock is extracted by the clock extraction circuit 605.

Figure 14:
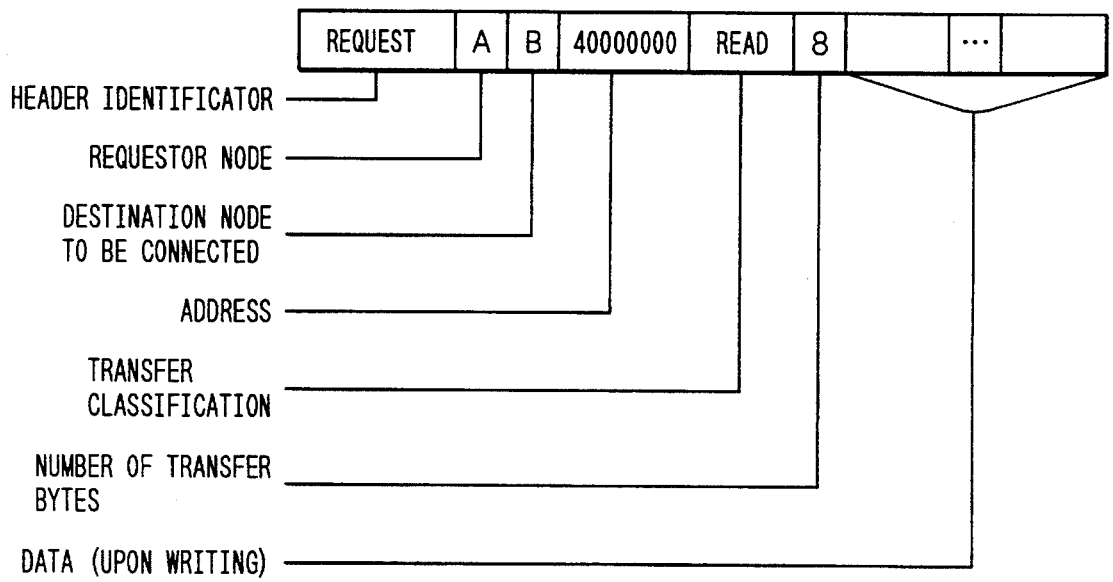
FIG. 14 is a view showing an access packet used in the first embodiment.

The clock extraction circuit 605 has a quartz crystal oscillator and performs the PLL in which its output is phase-locked with the edge of the receive signal, thereby extracting a clock. The receive data binarized by the identification reproducing circuit is input to the serial/parallel conversion circuit 601. The serial/parallel conversion circuit 601 is operated in accordance with the receive clock 219 to 5B/4B or parallel-converts the received serial data. If the packet is an idle packet, it is lost. If the packet is significant, it is recognized and output to the optical arbiter interface 204. A gain control output from the AGC circuit 608 is input to the oscillating circuit 607. The oscillating circuit 607 has a quartz crystal oscillator and finely changes its oscillation period in accordance with a gain. More specifically, if the gain is large (the power of light is small), the oscillation period is prolonged. If the gain is small (the power of light is large), the oscillation period is shortened. In this manner, the oscillating circuit 607 oscillates and outputs a transmit clock 220. The optical arbiter interface 204 recognizes the arrival of the packet and analyzes the packet. If it is the connection preparation request packet, the optical arbiter interface 204 detects permission of connection which is requested in advance, and uses the data transmission/reception request signal 212 to designate the optical data interface 205 to transmit an access packet shown in FIG. 14 using the assigned wavelength $\lambda_1$.

In the node B 102, as in the node A, the optical arbiter interface 204 analyzes the connection preparation request packet, informs the optical data interface 205 and the receiver 216 that a packet with the wavelength $\lambda_1$ is transmitted from the node A, and designates to receive the packet.

Figure 17:
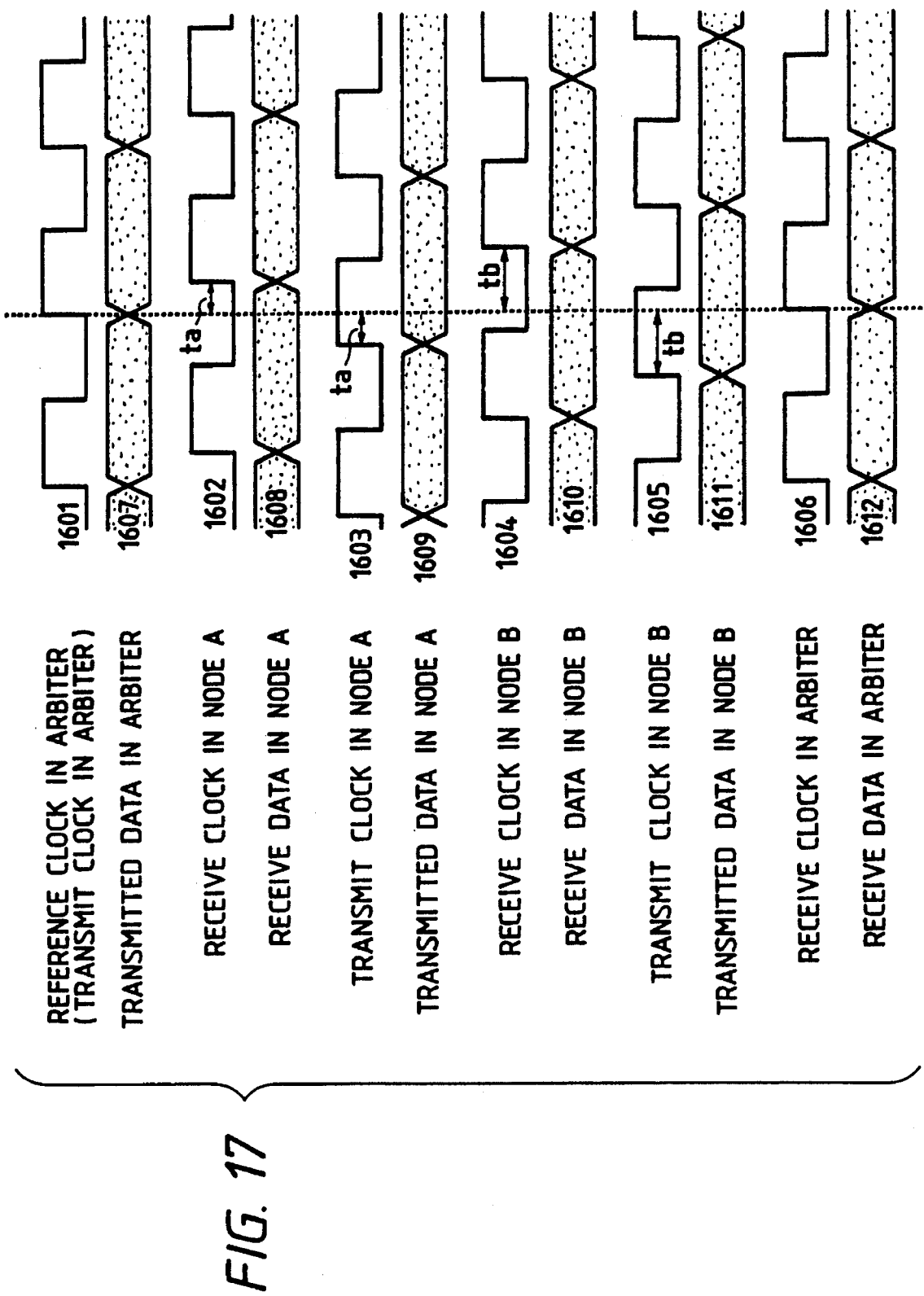
FIG. 17 is a timing chart showing the phase timings of clocks and data in the first embodiment.

The phases of clocks will be described below. FIG. 17 is a view showing the phases of clocks of signals of the arbitration wavelength $\lambda_0$ in the nodes A and B and the arbiter. The reference clock 315 defines a timing for a change in transmitted data in each of the transmitters 305 to 308 in the arbiter 122 and changes at a phase timing 1601. On the other hand, the transmitted data received by the node A 101 changes in the receiver 0 (213) at a clock timing 1602 because of a propagation delay in the optical fiber. More specifically, its phase is delayed from that of the reference clock by ta (sec).

However, the timing clock of transmitted data generated from the transmitter 0 (214) in the node A is extracted by the clock extraction circuit 406 of the receiver 301 in the arbiter 122 and input to the phase comparator 501 of the transmitter 305. An output from the phase comparator 501 changes the reference voltage 502 for the differential amplifying circuit 509 and changes the power of the LD 506 by feedback from the monitor PD 507, the peak-hold circuit 508, and the bias drive circuit 510. A change in power is held by the peak-hold circuit 606 of the receiver 0 (213) in the node A 101 and changes the oscillation phase of a transmit clock oscillated by the oscillating circuit 607 through the AGC circuit 608. Since the phase comparator 501 controls the reference voltage 502 such that no phase difference is present between the reference clock 315 and the receive clock 309, the receive clock in the arbiter and the reference clock in the arbiter are in phase in a normal state, as indicated by a phase timing 1606. The phase of a transmit clock 1603 in the node A is advanced from the reference clock by ta (sec).

Similarly, even when the node B is separated from the concentrator by a distance larger than that between the node A and the concentrator to cause a phase delay of tb (sec) in a receive clock 1604 in the node B, a transmit clock 1605 in the node B is controlled in the normal state to have a phase lead of tb (sec). For this reason, a receive clock in the arbiter in the receiver 302 also has the phase timing 1606.

The quartz crystal oscillator used in the clock 313 or the oscillating circuit 607 has a precision of about 10 ppm. For this reason, as far as control with 10,000 clocks (e.g., 100 μsec at a frequency of 100 MHz) can be performed, at least a phenomenon representing that one clock passes the other clock is prevented. Since light takes about 3 nsec to advance by 1 m, for example, 100 μsec correspond to a distance of 20 km or more in reciprocation.

<Phase 4> Transmission of Access Packet

The optical data interface 205 in the node A 101 assembles an access packet (FIG. 14) from latched bus information on the basis of the designation from the optical arbiter interface 204 and outputs the access packet to the transmitter 1 (216), and at the same time, designates the transmitter 1 (216) to output light of the wavelength $\lambda_1$ by the wavelength control signal 211. The tunable LD 903 selectively oscillates the wavelength $\lambda_1$ of the oscillatable wavelengths $\lambda_1$ and $\lambda_2$ in accordance with the wavelength control signal 211. The transmitted data is serially converted by the serial/parallel conversion circuit 901 and intensify-modulated by the pulse drive circuit 902, thereby driving the LD 903. Its timing clock is the transmit clock 220 generated by the oscillating circuit 607. The serial/parallel conversion circuit 901 generates no idle packet because interference with the remaining nodes may be caused. Therefore, the transmitter 1 (216) intensity-modulates an output from the LD 903 only when packet data is output from the optical data interface 205. An optical output from the LD is monitored by the monitor PD 904. The PD 904 is also tunable and selectively photoelectrically converts the wavelength $\lambda_1$ in accordance with the wavelength control signal 211. The peak value of an output from the monitor PD 904 is held by the peak-hold circuit 905. The output from the PD 904 is input to the differential amplifying circuit 907 together with the reference voltage generated by the reference voltage generating circuit 906. The differential amplifying circuit 907 performs feedback through the bias drive circuit 908 such that the LD emits light having a predetermined power. In place of the tunable LD and PD, LDs and PDs for the wavelengths $\lambda_1$ and $\lambda_2$ may be provided and switched in accordance with a designation. In this manner, the transmitter 216 issues an access packet with light of the wavelength $\lambda_1$.

The light of the wavelength $\lambda_1$ is multiplexed by the wavelength multiplexer 218, propagates in the optical fiber cable 107, is demultiplexed by the wavelength demultiplexer 118, and is input to the star coupler 123. The star coupler 123 distributes and outputs the optical signal to the wavelength multiplexers 114 to 117, i.e., the nodes A to D. The optical signal is transmitted to the node B 102 through the wavelength multiplexer 115 and the optical fiber cable 108.

<Phase 5> Reception of Access Packet and Issue of Acknowledge Packet

The receiver 215 in the node B 102 is also designated by the wavelength designation signal 211 from the optical data interface 205 to receive light of the wavelength $\lambda_1$ from the node A. For this reason, the tunable PD 804 selectively receives the wavelength $\lambda_1$. An output from the PD 804 is input to the amplifying circuit 803 and the peak-hold circuit 805. The gain to the amplifying circuit 803 is controlled to a level suitable for binarization by the AGC circuit 805 which receives the output of the peak value held by the peak-hold circuit 805. The receive data is binarized by the identification reproducing circuit 802, parallelly converted by the serial/parallel conversion circuit 801, and output. The timing clock at this time is a clock generated by the clock extraction circuit 605 of the receiver 0 (213). The parallelly converted access packet is output to the optical data interface 205. The optical data interface 205 analyzes the access packet. After the rights of use of the buses 208 to 210 are obtained, access information equivalent to the access packet is output onto the buses 208 to 210, thereby performing bus access in the node.

Figure 15:
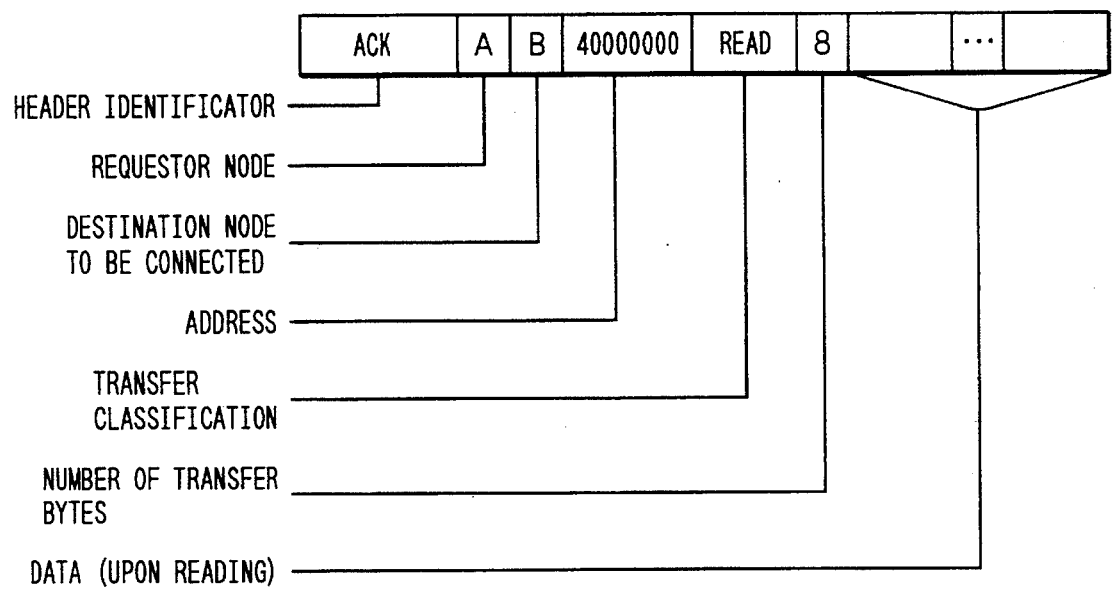
FIG. 15 is a view showing an acknowledge packet used in the first embodiment.

In this example, read access to data corresponding 8 bytes from address 40000000h is performed, so that the corresponding data is returned from the RAM 206. The optical data interface 205 assembles an acknowledge packet shown in FIG. 15 to latch the data and transmit the data to the node A 101. The acknowledge packet is transmitted to the transmitter 1 (216). As in the node A, the transmitter 1 (216) temporarily transmits the acknowledge packet with the designated wavelength $\lambda_1$ to the concentrator 105 through the wavelength multiplexer 218 and the optical fiber cable 109. In the concentrator 105, demultiplexing is performed by the wavelength demultiplexer 119, and a signal of the data transfer wavelength is transmitted to the star coupler 123. The star coupler 123 distributes and outputs the optical signal to the wavelength multiplexers 114 to 117, i.e., the nodes A to D.

<Phase 6> Reception of Acknowledge Packet and Transmission of End Packet

The optical signal is transmitted to the node A 101 through the wavelength multiplexer 114 and the optical fiber cable 106. In the optical data interface 205 in the node A 101, preparation for reception of a packet with the wavelength $\lambda_1$ designated by the connection preparation request packet is completed. The optical signal transmitted to the node A 101 is demultiplexed by the wavelength demultiplexer 217, and light of a wavelength other than the wavelength $\lambda_0$ is input to the receiver 1 (215). The receiver 1 (215) converts the serial optical signal of the wavelength $\lambda_1$ into a parallel electrical signal and transmits the optical signal to the optical data interface 205. Since this packet is the acknowledge packet for the read access packet for data corresponding to 8 bytes from the address 40000000h, which is transmitted in advance, the optical data interface decodes the acknowledge packet. After the rights of use of the buses 208 to 210 are obtained, the corresponding data is output onto the data bus 208, and an acknowledge signal is output onto the control signal bus 210 at appropriate timings for satisfying the bus protocol. The processor 201 receives this data, thereby continuing processing.

Figure 16:
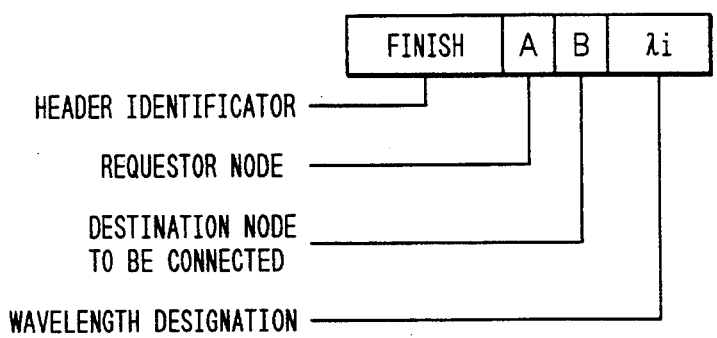
FIG. 16 is a view showing an end packet used in the first embodiment.

The optical data interface 205 which supplies the data to the processor 201 uses the data transmission/reception request signal 212 to request the optical arbiter interface 204 to transmit an end packet shown in FIG. 16. The requested optical arbiter interface 204 assembles the end packet and transmits it to the transmitter 0 (214). The transmitter 0 (214) transmits the end packet with the arbitration wavelength $\lambda_0$ to the arbiter 122 in the concentrator 105 through the wavelength multiplexer 218 and the optical fiber cable 107.

<Phase 6> End of Access

The ACMC 314 in the arbiter 122 decodes the end packet and sets the channel use state flag such that it reflects that transfer between the nodes A 101 and B 102 is completed, and the assigned wavelength is released.

In this manner, read access processing of data corresponding to 8 bytes from the address 40000000h and present in the RAM 206 in the node B 102, which is requested by the processor 201 in the node A 101, is completed. In write access, almost the same processing is performed except that the data transfer direction is reversed. This processing is performed in data transfer not only between the nodes A and B but also between arbitrary nodes.

Referring back to FIG. 17, the phases of data and clock will be described. In each node, the transmit clock 220 of the arbitration wavelength $\lambda_0$ is also used with the data transfer wavelengths $\lambda_1$ and $\lambda_2$.

Figure 1:
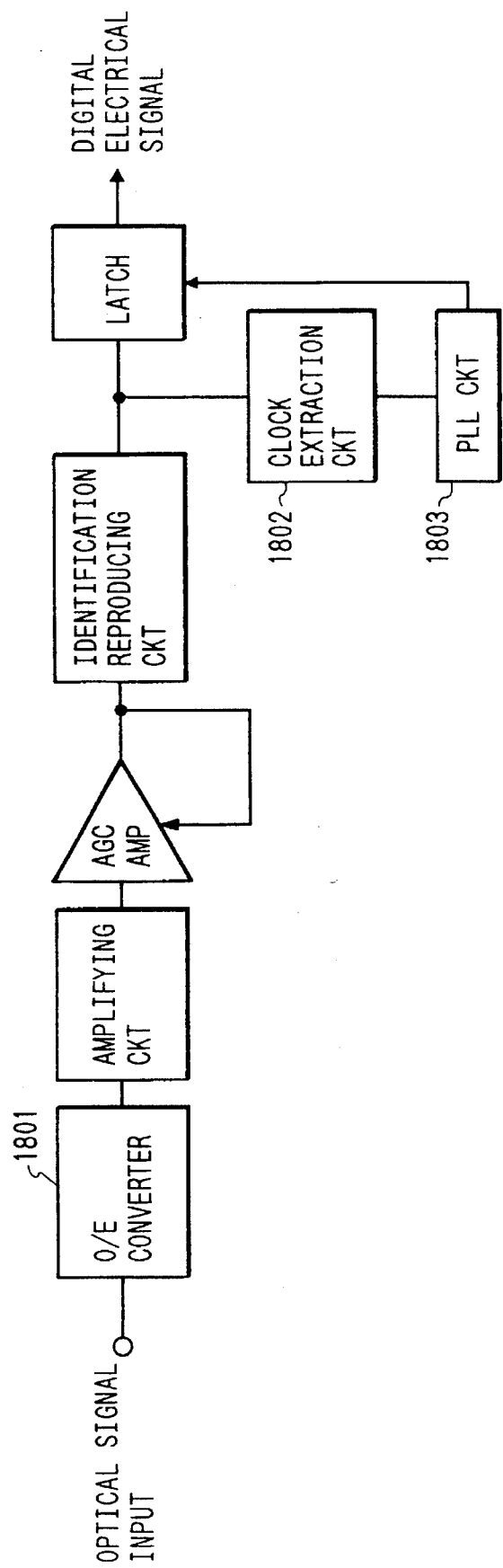
FIG. 1 is a block diagram showing clock reproduction by a self synchronizing method.
Figures 18, 18A:
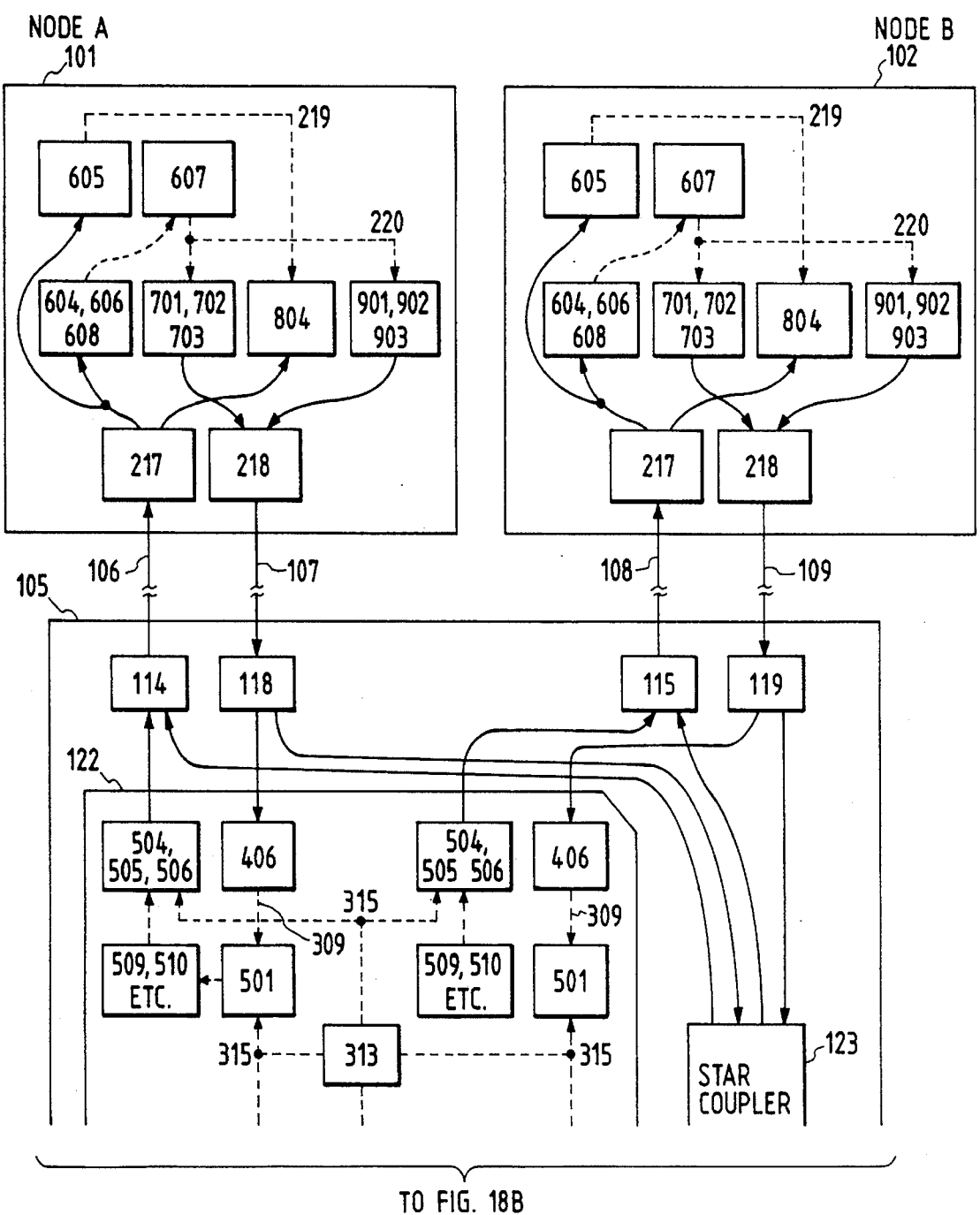
FIG. 18 is comprised of FIGS. 18A and 18B showing block diagrams clock control of the first embodiment.
Figure 18B:
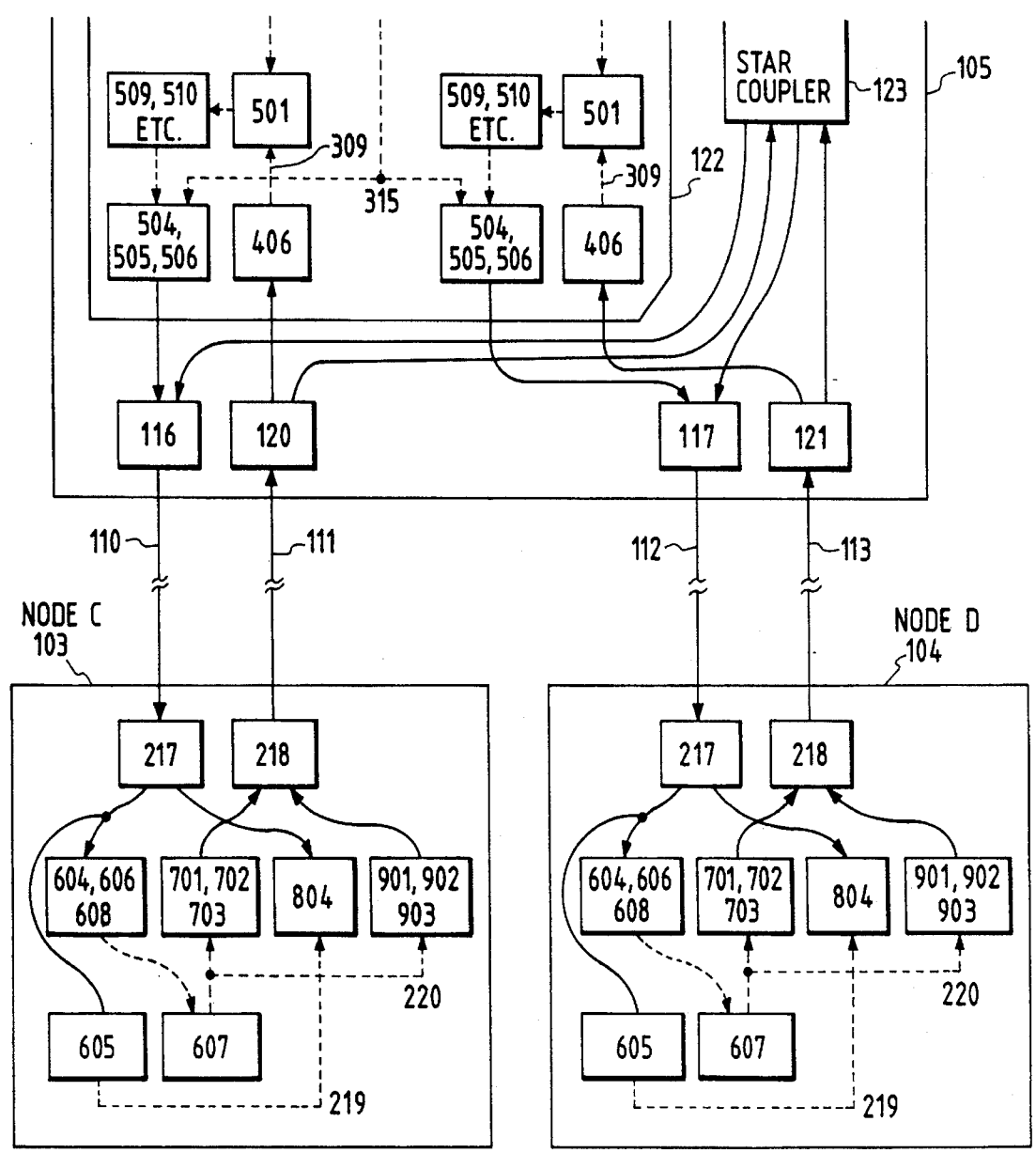

The phase timing of the access packet data transmitted from the node A in Phase 4 is equal to a phase timing 1609. Light beams of the wavelengths $\lambda_0$ and $\lambda_1$ propagate in the same optical fiber. For this reason, when the access packet data arrives at the concentrator 105, a phase timing 1612 is set, and when the access packet data arrives at the node B, a phase timing 1610 is set. Therefore, the receiver 1 (215) in the node B can receive the data 1610 transmitted from the node A and received by the node B in accordance with the receive clock 219, 1604 generated by the clock extraction circuit 605 of the receiver 0 (213) by a latch or the like. Similarly, the phase timing of the acknowledge packet transmitted from the node B in Phase 5 is equal to a phase timing 1611. When the acknowledge packet arrives at the concentrator 105, a phase timing 1612 is set, and when the acknowledge packet arrives at the node A, a phase timing 1608 is set. Therefore, the receiver 1 (215) in the node A can receive the data 1608 transmitted from the node B and received by the node A in accordance with the receive clock 219, 1602 generated by the clock extraction circuit 605 of the receiver 0 (213) by a latch or the like. FIGS. 18A and 18B are block diagrams showing a portion related to clock control in this embodiment in FIG. 1. Reference numerals in FIGS. 18A and 18B correspond to those used in FIGS. 1 to 9. In this embodiment, all data transfer signals output from the nodes to the star coupler are in phase in the star coupler. In addition, data transfer signals received by the nodes through the star coupler are always in phase upon receipt by each node.

In this embodiment, the arbiter having a means for performing transmission/reception of a signal between the nodes and the star coupler are provided in one concentrator, and the channels are multiplexed by wavelength multiplexing. However, the present invention is not limited to this. In each node, the first channel connected to the star coupler and the second channel connected to the transmitter and the receiver of the arbiter may be formed by different channels without being multiplexed. In this case, it is necessary only to avoid a state in which the optical channel lengths of the first and second channels are largely different from each other, and a clock set on the second channel in the above-described manner cannot be used on the first channel, i.e., a state in which the clock of a signal transmitted from a certain node is shifted by one period or more.

As has been described above, according to the present invention, no clock need to be extracted by PPL on the receive side as for the first optical channel. For this reason, an optical channel for frequently changing connection can be realized without decreasing the real data transmission speed while decreasing the overhead for connection.

In addition, in this embodiment, the data rates of the first and second optical channels are set to be equal with each other. However, the same interpretation can be applied as far as one of the data rates is an integral multiple of the other because an output from the oscillating or extracting means can be frequency-divided or multiplied to cope with the change in data rate.

What is claimed is:

1. An optical communication apparatus constituted by a plurality of optical communication apparatuses connected by a star coupler, comprising:

a plurality of optical communication apparatuses;

a star coupler connected to said plurality of optical communication apparatuses;

receiving means, arranged near said star coupler, for receiving a signal from each of said optical communication apparatuses;

transmitting means, arranged near said star coupler, for transmitting a signal to each of said optical communication apparatuses;

means for supplying a reference clock to said transmitting means; and first clock extracting means, arranged near said star coupler, for extracting a clock of the signal received from each of said optical communication apparatuses by said receiving means, generating a phase comparison information signal of the extracted clock and the reference clock, and supplying the phase comparison information signal to said transmitting means, wherein each of said optical communication apparatuses has second clock extracting means for extracting a clock from the signal from said transmitting means, means for extracting the phase comparison information signal contained in the signal from said transmitting means, and means for controlling and oscillating a transmit clock of the signal to be transmitted from said optical communication apparatus such that a phase difference represented by the phase comparison information signal is minimized.

2. A system according to claim 1, wherein, in each of said optical communication apparatuses, the controlled transmit clock is used as the transmit clock, and the clock extracted from the signal from said transmitting means is used as a receive clock during communication performed through said star coupler.

3. A system according to claim 1, wherein the phase comparison information signal is set in the signal from said transmitting means by modulating an intensity level of the signal transmitted from said transmitting means by the phase comparison information signal, said means for extracting the phase comparison information signal in each of said optical communication apparatuses is means for detecting the intensity level of the signal from said transmitting means, and the phase comparison information signal is extracted from the signal from said transmitting means by detecting the intensity level of the signal from said transmitting means.

4. A system according to claim 3, wherein the means for detecting the intensity level is also at least partially used as means for keeping a predetermined signal intensity upon receipt of the signal from said transmitting means, and the phase comparison information signal is extracted from the signal from said transmitting means as a gain necessary for keeping the predetermined signal intensity.

5. A system according to claim 1, wherein, for each said optical communication apparatus, a channel between said optical communication apparatus at one end and said receiving means and said transmitting means at another end is multiplexed with a channel between said optical communication apparatus and said star coupler to constitute a common path.

6. A system according to claim 1, further comprising an arbiter for performing arbitration of communication performed by each of said optical communication apparatuses through said star coupler, said arbiter transmitting/receiving an arbitration signal to/from each of said optical communication apparatuses by said receiving means and said transmitting means.

7. A system according to claim 6, wherein said arbiter and said star coupler are arranged in a concentrator.

8. A system according to claim 1, wherein said receiving means comprises a plurality of receivers which correspond to said plurality of optical communication apparatuses one to one, and said transmitting means comprises a plurality of transmitters which correspond to said plurality of optical communication apparatuses one to one.

9. An optical communication method in an optical communication system constituted by a plurality of optical communication apparatuses connected by a star coupler, comprising the steps of:

receiving a signal from each of the optical communication apparatuses by receiving means arranged near the star coupler and extracting a clock from the received signal;

generating a phase comparison information signal of the extracted clock and a reference clock supplied near the star coupler;

transmitting a signal containing at least the generated phase comparison information signal and the reference clock to each of the optical communication apparatuses by transmitting means arranged near the star coupler;

extracting the reference clock and the phase comparison information signal from the signal transmitted from the transmitting means in each of the optical communication apparatuses; and controlling a transmit clock in each of the optical communication apparatuses such that a phase difference represented by the extracted phase comparison information signal is minimized.

10. A method according to claim 9, wherein, in each of the optical communication apparatuses, the controlled transmit clock is used as the transmit clock, and the clock extracted from the signal from the transmitting means is used as a receive clock during communication performed through the star coupler.

11. A method according to claim 9, wherein the phase comparison information signal is set in the signal from the transmitting means by modulating an intensity level of the signal transmitted from the transmitting means by the phase comparison information signal, and the phase comparison information signal is extracted from the signal from the transmitting means by detecting the intensity level of the signal from the transmitting means in each of the optical communication apparatuses.

12. A method according to claim 11, wherein, in each of the optical communication apparatuses, the intensity level of the signal from the transmitting means is detected to extract the phase comparison information signal from the signal from the transmitting means as a gain necessary for keeping a predetermined intensity level of the signal from the transmitting means.

13. A method according to claim 9, wherein, for each optical communication apparatus, a channel between the optical communication apparatus at one end and the receiving means and the transmitting means at another end is multiplexed with a channel between the optical communication apparatus and the star coupler to constitute a common path.

14. A method according to claim 9, wherein an arbiter for performing arbitration of communication performed by each of the optical communication apparatuses through the star coupler is provided, the arbiter transmitting/receiving an arbitration signal to/from each of the optical communication apparatuses by the receiving means and the transmitting means.

15. A method according to claim 14, wherein the arbiter and the star coupler are arranged in a concentrator.

\* \* \* \* \*